(12) United States Patent
Mitarai

(10) Patent No.: US 10,661,611 B2
(45) Date of Patent: May 26, 2020

(54) PNEUMATIC TIRE

(71) Applicant: SUMITOMO RUBBER INDUSTRIES, LTD., Kobe-shi, Hyogo (JP)

(72) Inventor: Yasuo Mitarai, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 522 days.

(21) Appl. No.: 15/400,033

(22) Filed: Jan. 6, 2017

(65) Prior Publication Data

US 2017/0197479 A1    Jul. 13, 2017

(30) Foreign Application Priority Data

Jan. 8, 2016 (JP) .................................. 2016-002434

(51) Int. Cl.
*B60C 17/00* (2006.01)
*B60C 15/024* (2006.01)
(Continued)

(52) U.S. Cl.
CPC ............ *B60C 17/0036* (2013.01); *B60C 3/04* (2013.01); *B60C 13/02* (2013.01);
(Continued)

(58) Field of Classification Search
CPC ..... Y10T 152/10738; Y10T 152/10819; Y10T 152/10837; B60C 3/00; B60C 3/04; B60C 13/02; B60C 15/00; B60C 15/0009; B60C 15/02; B60C 15/024; B60C 15/0242; B60C 15/0603; B60C 15/0607; B60C 2015/009; B60C 2015/061; B60C 17/00;
(Continued)

(56) References Cited

U.S. PATENT DOCUMENTS 3,517,720 A * 6/1970 Brown ...................... B60C 3/04
152/454 X
6,257,290 B1 * 7/2001 Sakamoto ............... B60C 13/02
152/523 X
(Continued)

FOREIGN PATENT DOCUMENTS

JP      2006117100 A  *  5/2006
WO   WO-2015/012026 A1 *  1/2015

OTHER PUBLICATIONS

English machine translation of JP 2006-117100 A, May 11, 2006.*

*Primary Examiner* — Adrienne C. Johnstone
(74) *Attorney, Agent, or Firm* — Birch, Stewart, Kolasch & Birch, LLP

(57) ABSTRACT

In a side reinforcing type tire 2, when a cross-sectional height of the tire 2 is denoted by L, a height in a radial direction from a bead base line to an outer edge of a core 34 is denoted by HC, a point on a turned-up portion 42 of a carcass ply 38 at which point a height in the radial direction from the bead base line is 0.35 times of the height L is denoted by P1, and a point on the turned-up portion 42 at which point the height in the radial direction from the bead base line is equal to the height HC is denoted by P2, the turned-up portion 42 has, between the point P1 and the point P2, a shape that is a curved line projecting inward in an axial direction, a straight line, or a combination thereof.

4 Claims, 3 Drawing Sheets

(51) Int. Cl.
*B60C 3/04* (2006.01)
*B60C 15/00* (2006.01)
*B60C 13/02* (2006.01)
B60C 15/06 (2006.01)

(52) U.S. Cl.
CPC ...... *B60C 15/0009* (2013.01); *B60C 15/0045* (2013.01); *B60C 15/0054* (2013.01); *B60C 15/0242* (2013.01); *B60C 17/0009* (2013.01); B60C 2015/061 (2013.01); B60C 2017/0072 (2013.01); *Y10T 152/10837* (2015.01)

(58) Field of Classification Search
CPC ............ B60C 17/0009; B60C 17/0018; B60C 17/0027; B60C 17/0036; B60C 17/0045; B60C 2017/0054; B60C 2017/0063; B60C 2017/0072
USPC ....... 152/454, 513, 516–517, 523, 539, 541, 152/544, 552, 554
See application file for complete search history.

(56) References Cited

U.S. PATENT DOCUMENTS

| | | |
|---|---|---|
| 2011/0000597 A1 | 1/2011 | Hottebart |
| 2014/0027034 A1* | 1/2014 | Molzow-Voit ...... B60C 15/0242 152/513 |
| 2014/0305567 A1 | 10/2014 | Mitarai |
| 2016/0159149 A1* | 6/2016 | Kawashima ........ B60C 17/0009 152/454 |

\* cited by examiner

PNEUMATIC TIRE

This application claims priority on Patent Application No. 2016-002434 filed in JAPAN on Jan. 8, 2016. The entire contents of this Japanese Patent Application are hereby incorporated by reference.

BACKGROUND OF THE INVENTION

Field of the Invention

The present invention relates to pneumatic tires. Specifically, the present invention relates to run flat tires including load support layers.

Description of the Related Art

In recent years, run flat tires including load support layers inside sidewalls have been developed and widespread. Highly hard crosslinked rubber is used for the support layers. This run flat tire is called a side reinforcing type. In the side reinforcing type run flat tire, if the internal pressure is reduced due to puncture, a load is supported by the support layers. The support layers suppress flexure of the tire in a punctured state. This run flat tire allows for running for some distance even in the punctured state. Running in the punctured state is referred to as run-flat running.

During run-flat running, each bead portion repeats deformation and restoration. This causes heat generation in the bead portion. When run-flat running is performed for a long period of time, damage of the bead portion may occur due to the heat generation and the deformation. Run flat tires are desired to have high run-flat durability such that damage of each bead portion does not occur even during run-flat running for a long period of time.

The load support layers may cause an increase in the weight and the rolling resistance of the tire. In addition, highly hard load support layers increase the vertical stiffness constant of the tire. This may deteriorate ride comfort during normal running. If the sizes of the load support layers are reduced, these problems can be improved. However, the small-sized load support layers may impair run-flat durability.

There is a method of forming the load support layers from a rubber having a low heat build-up property, thereby suppressing heat generation to improve run-flat durability. In addition, there is a method of enhancing the heat release performance of a tire, thereby suppressing temperature rise of the tire to improve run-flat durability. Examination regarding a run flat tire whose temperature rise is suppressed is disclosed in JP2013-60162 (US2014/0305567).

There is a method of increasing the number of carcass plies or adding a reinforcing layer to each bead portion, thereby improving run-flat durability. Examination regarding a tire including a reinforcing layer provided in each bead portion is disclosed in JP2011-506199 (US2011/0000597).

Further improvement of run-flat durability with favorable ride comfort during normal running and low rolling resistance being maintained is desired. When the load support layers are formed from a rubber having a low heat build-up property, the strength of the load support layers may be decreased. An increase in the number of carcass plies and insertion of a reinforcing layer to each bead portion may cause an increase in the weight and the vertical stiffness constant of the tire. This may deteriorate ride comfort and rolling resistance. The method of enhancing the heat release performance of the tire is effective for improvement of run-flat durability. In addition to this, by improving the structure of the tire, further improvement of run-flat durability can be achieved.

An object of the present invention is to provide a pneumatic tire having improved run-flat durability, while favorable ride comfort during normal running and low rolling resistance are maintained, by improving the structure of each bead portion.

SUMMARY OF THE INVENTION

A pneumatic tire according to the present invention includes: a pair of beads each located in a side portion; a carcass extending on and between the one bead and the other bead; and a pair of load support layers each located in the side portion and inward of the carcass in an axial direction. A rim protector is formed in the side portion so as to be project outward in the axial direction in a tapered shape. Each bead includes a core and an apex extending from the core outward in a radial direction. The carcass includes a carcass ply. The carcass ply is turned up around the core from an inner side toward an outer side in the axial direction. Because of this turning-up, a main portion and turned-up portions are formed in the carcass ply. When a cross-sectional height of the tire is denoted by L, a height in the radial direction from a bead base line to an outer edge of the core is denoted by HC, a point on the turned-up portion at which point a height in the radial direction from the bead base line is 0.35 times of the height L is denoted by P1, and a point on the turned-up portion at which point the height in the radial direction from the bead base line is equal to the height HC is denoted by P2, the turned-up portion has, between the point P1 and the point P2, a shape that is a curved line projecting inward in the axial direction, a straight line, or a combination thereof. A ratio (ML/L) of a height ML in the radial direction from the bead base line to a top of the rim protector relative to the height L is equal to or greater than 0.40 and equal to or less than 0.60.

For protecting a rim, a run flat tire includes rim protectors in many cases. Regarding a run flat tire including rim protectors, the inventors have made examination for the structure of each bead portion for improving run-flat durability. As a result, the inventors have found that favorable run-flat durability is obtained by appropriately shaping each turned-up portion of a carcass ply and adjusting the position of each rim protector. In the tire, the bead portion does not include a reinforcing layer. In the tire, an increase in the weight and the vertical stiffness constant thereof is suppressed. In the tire, the run-flat durability is improved while favorable ride comfort and low rolling resistance are maintained.

Preferably, a ratio (BL/L) of a height BL in the radial direction from the bead base line to an end of the apex relative to the height L is equal to or greater than 0.45 and equal to or less than 0.65.

Preferably, the apex has a shape tapered outward in the radial direction, and when a width, in the axial direction, of the apex at a midpoint, in the radial direction, of the apex is denoted by WE and a width, in the axial direction, of a radially outer surface of the core is denoted by WC, a ratio (WE/WC) of the width WE relative to the width WC is equal to or greater than 0.50 and equal to or less than 0.80.

Preferably, a ratio (WT/WR) of a clip width WT of the tire relative to a rim width WR is equal to or greater than 0.97 and equal to or less than 1.03.

DESCRIPTION OF THE PREFERRED EMBODIMENTS

The following will describe in detail the present invention based on preferred embodiments with appropriate reference to the drawings.

Figure 1:
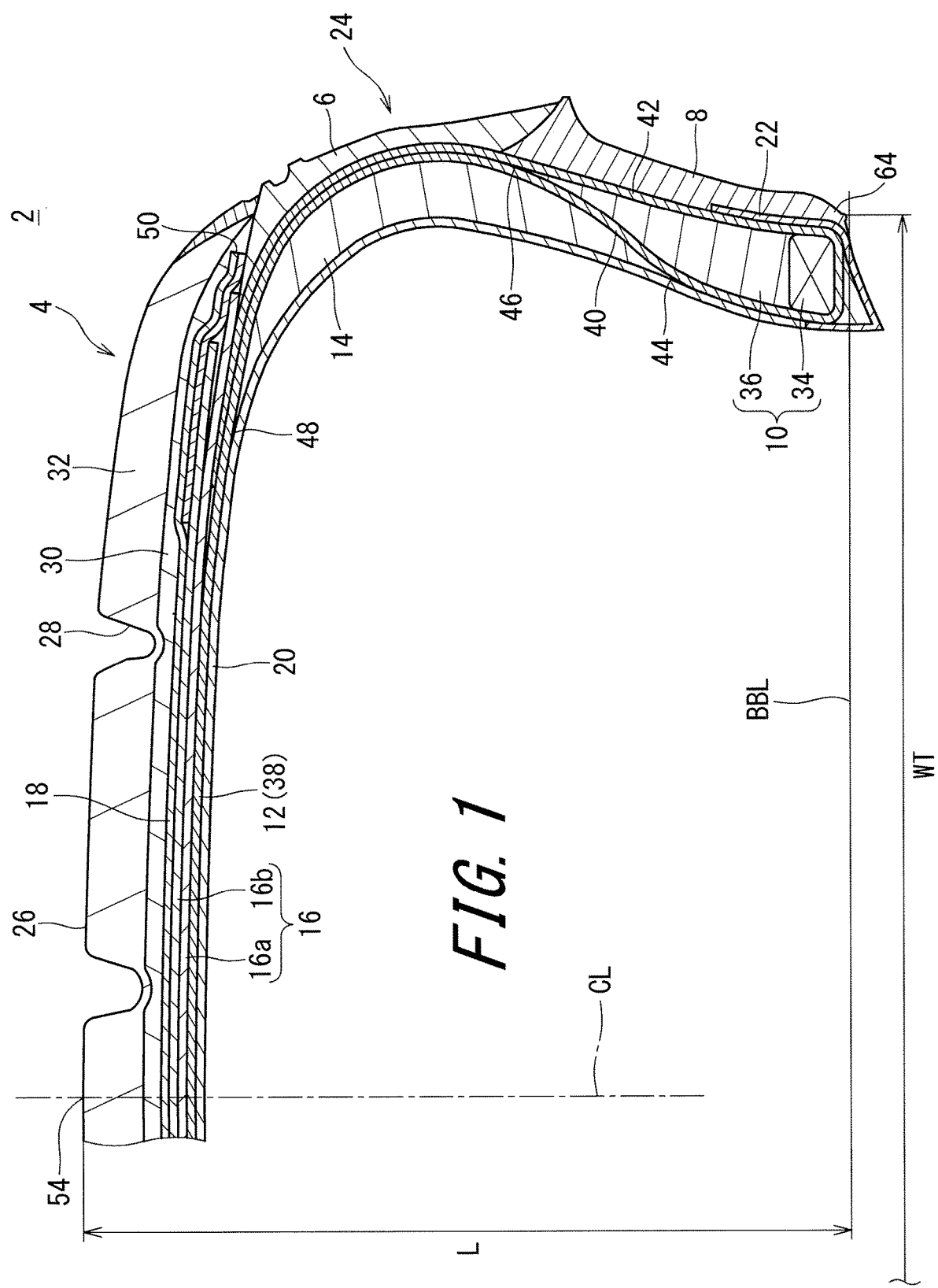
FIG. 1 is a cross-sectional view of a portion of a tire according to an embodiment of the present invention.

FIG. 1 shows a pneumatic tire 2. In FIG. 1, the up-down direction is the radial direction of the tire 2, the right-left direction is the axial direction of the tire 2, and the direction perpendicular to the surface of the sheet is the circumferential direction of the tire 2. In FIG. 1, an alternate long and short dash line CL represents the equator plane of the tire 2. The shape of the tire 2 is symmetrical about an equator plane except for a tread pattern.

The tire 2 includes a tread 4, a pair of sidewalls 6, a pair of clinches 8, a pair of beads 10, a carcass 12, a pair of load support layers 14, a belt 16, a band 18, an inner liner 20, and a pair of chafers 22. A portion of the tire 2 which portion extends from the vicinity of each edge of the tread 4 inward in the radial direction is referred to as a side portion 24. Each clinch 8, each bead 10, each load support layer 14, and each chafer 22 are located in the side portion 24. The tire 2 is of a tubeless type. The tire 2 is mounted to a passenger car.

The tread 4 has a shape projecting outward in the radial direction. The tread 4 forms a tread surface 26 that is brought into contact with a road surface. Grooves 28 are formed on the tread surface 26. The tread pattern is formed by the grooves 28. The tread 4 includes a base layer 30 and a cap layer 32. The cap layer 32 is located outward of the base layer 30 in the radial direction. The cap layer 32 is laminated on the base layer 30. The base layer 30 is formed from a crosslinked rubber that is excellent in adhesiveness. A typical base rubber of the base layer 30 is a natural rubber. The cap layer 32 is formed from a crosslinked rubber that is excellent in wear resistance, heat resistance, and grip performance.

Each sidewall 6 extends from the edge of the tread 4 substantially inward in the radial direction. The radially outer edge of the sidewall 6 is joined to the tread 4. The radially inner edge of the sidewall 6 is joined to the clinch 8. The sidewall 6 is formed from a crosslinked rubber that is excellent in cut resistance and weather resistance. The sidewall 6 is located outward of the carcass 12 in the axial direction. The sidewall 6 prevents the carcass 12 from being damaged.

In light of prevention of damage, a hardness of each sidewall 6 is preferably equal to or greater than 50 and more preferably equal to or greater than 55. In light of ride comfort in a normal state, the hardness is preferably equal to or less than 70 and more preferably equal to or less than 65.

In the present embodiment, the hardness is measured according to the standard of "JIS K6253" with a type A durometer. The hardness is measured by pressing the durometer against the cross section shown in FIG. 1. The measurement is performed at 23° C. Hardnesses of each clinch 8, each apex, and each load support layer 14 described later are measured in the same manner.

Each clinch 8 is located substantially inward of the sidewall 6 in the radial direction. The clinch 8 is located outward of the bead 10 and the carcass 12 in the axial direction. The clinch 8 is formed from a crosslinked rubber that is excellent in wear resistance. The clinch 8 comes into contact with a flange of a rim, which is not shown.

In light of wear resistance, the hardness of the clinch 8 is preferably equal to or greater than 60 and more preferably equal to or greater than 65. In light of ride comfort in a normal state, the hardness is preferably equal to or less than 90 and more preferably equal to or less than 80.

Each bead 10 is located inward of the sidewall 6 in the radial direction. The bead 10 is located inward of the clinch 8 in the axial direction. The bead 10 includes a core 34 and an apex 36 extending from the core 34 outward in the radial direction. The core 34 has a ring shape and includes a non-stretchable wound wire. A typical material of the wire is steel. The apex 36 is tapered outward in the radial direction. The apex 36 is formed from a highly hard crosslinked rubber.

From the standpoint that a bead 10 portion has appropriate stiffness, the hardness of the apex 36 is preferably equal to or greater than 60 and more preferably equal to or greater than 65. In light of ride comfort in a normal state, the hardness is preferably equal to or less than 90 and more preferably equal to or less than 80.

The carcass 12 includes a carcass ply 38. The carcass ply 38 extends on and between the beads 10 at both sides.

The carcass ply 38 extends along the tread 4 and each sidewall 6. The carcass ply 38 is turned up around each core 34 from the inner side toward the outer side in the axial direction. Because of this turning-up, a main portion 40 and turned-up portions 42 are formed in the carcass ply 38. The edge of each turned-up portion 42 reaches a position directly below the belt 16. In other words, each turned-up portion 42 overlaps the belt 16. The carcass 12 has a so-called "ultra-highly turned-up structure". The carcass 12 having the ultra-highly turned-up structure contributes to the durability of the tire 2 in a punctured state.

As shown in FIG. 1, the main portion 40 is located inward of the apex 36 in the axial direction. The turned-up portion 42 is located outward of the apex 36 in the axial direction. In other words, the apex 36 is located between the main portion 40 and the turned-up portion 42 of the carcass ply 38.

The carcass ply 38 includes a large number of cords aligned with each other, and a topping rubber, which are not shown. The absolute value of the angle of each cord relative to the equator plane is 75° to 90°. In other words, the carcass 12 has a radial structure. The cords are formed from an organic fiber. Examples of preferable organic fibers include polyethylene terephthalate fibers, nylon fibers, rayon fibers, polyethylene naphthalate fibers, and aramid fibers.

Each load support layer 14 is located inward of the sidewall 6 in the axial direction. The load support layer 14 is located inward of the carcass 12 in the axial direction. The load support layer 14 is located outward of the inner liner 20 in the axial direction. The load support layer 14 is interposed between the carcass 12 and the inner liner 20. The load support layer 14 is tapered inward in the radial direction and also tapered outward in the radial direction. The load support layer 14 has a crescent-like shape. In the radial direction, an inner edge 44 of the load support layer 14 is located inward of an end 46 of the apex 36. In other words, the load support layer 14 overlaps the apex 36. A radially outer edge 48 of the load support layer 14 is located inward of an edge 50 of the belt 16 in the axial direction. In other words, the load support layer 14 overlaps the belt 16.

The load support layer 14 is formed from a highly hard crosslinked rubber. When the tire 2 is punctured, the load support layer 14 supports a load. The load support layer 14 allows for running for some distance with the tire 2 even in a punctured state. The tire 2 is also referred to as a run flat tire. The tire 2 is of a side reinforcing type. The tire 2 may include load support layers 14 each having a shape different from the shape of the load support layer 14 shown in FIG. 1.

From the standpoint that a load can be supported during run-flat running, the hardness of the load support layer 14 is preferably equal to or greater than 60 and more preferably equal to or greater than 65. In light of ride comfort in a normal state, the hardness is preferably equal to or less than 90 and more preferably equal to or less than 80.

The belt 16 is located inward of the tread 4 in the radial direction. The belt 16 is laminated on the carcass 12. The belt 16 reinforces the carcass 12. The belt 16 includes an inner layer 16a and an outer layer 16b. As is obvious from FIG. 1, the width of the inner layer 16a is slightly larger than the width of the outer layer 16b. Each of the inner layer 16a and the outer layer 16b includes a large number of cords aligned with each other, and a topping rubber, which are not shown. Each cord is tilted relative to the equator plane. The absolute value of the tilt angle is normally equal to or greater than 10° and equal to or less than 35°. The direction in which each cord of the inner layer 16a is tilted relative to the equator plane is opposite to the direction in which each cord of the outer layer 16b is tilted relative to the equator plane. The material of the cords is preferably steel. An organic fiber may be used for the cords. The belt 16 may include three or more layers.

The band 18 is located outward of the belt 16 in the radial direction. The width of the band 18 is substantially equal to the width of the belt 16 in the axial direction. The band 18 includes a cord and a topping rubber, which are not shown. The cord is helically wound. The band 18 has a so-called jointless structure. The cord extends substantially in the circumferential direction. The angle of the cord relative to the circumferential direction is equal to or less than 5° and further equal to or less than 2°. The belt 16 is held by the cord, so that lifting of the belt 16 is suppressed. The cord is formed from an organic fiber. Examples of preferable organic fibers include nylon fibers, polyester fibers, rayon fibers, polyethylene naphthalate fibers, and aramid fibers.

The belt 16 and the band 18 form a reinforcing layer. The reinforcing layer may be composed of only the belt 16. The reinforcing layer may be composed of only the band 18.

The inner liner 20 is joined to the inner surfaces of the carcass 12 and each load support layer 14. The inner liner 20 is formed from a crosslinked rubber. For the inner liner 20, a rubber that is excellent in air blocking property is used. The inner liner 20 maintains the internal pressure of the tire 2.

Each chafer 22 is located in the vicinity of the bead 10. When the tire 2 is mounted onto the rim, the chafer 22 comes into contact with the rim. Because of this contact, the vicinity of the bead 10 is protected. The chafer 22 includes a fabric and a rubber with which the fabric is impregnated. The chafer 22 may be integrated with the clinch 8. In this case, the material of the chafer 22 is the same as the material of the clinch 8.

Figure 2:
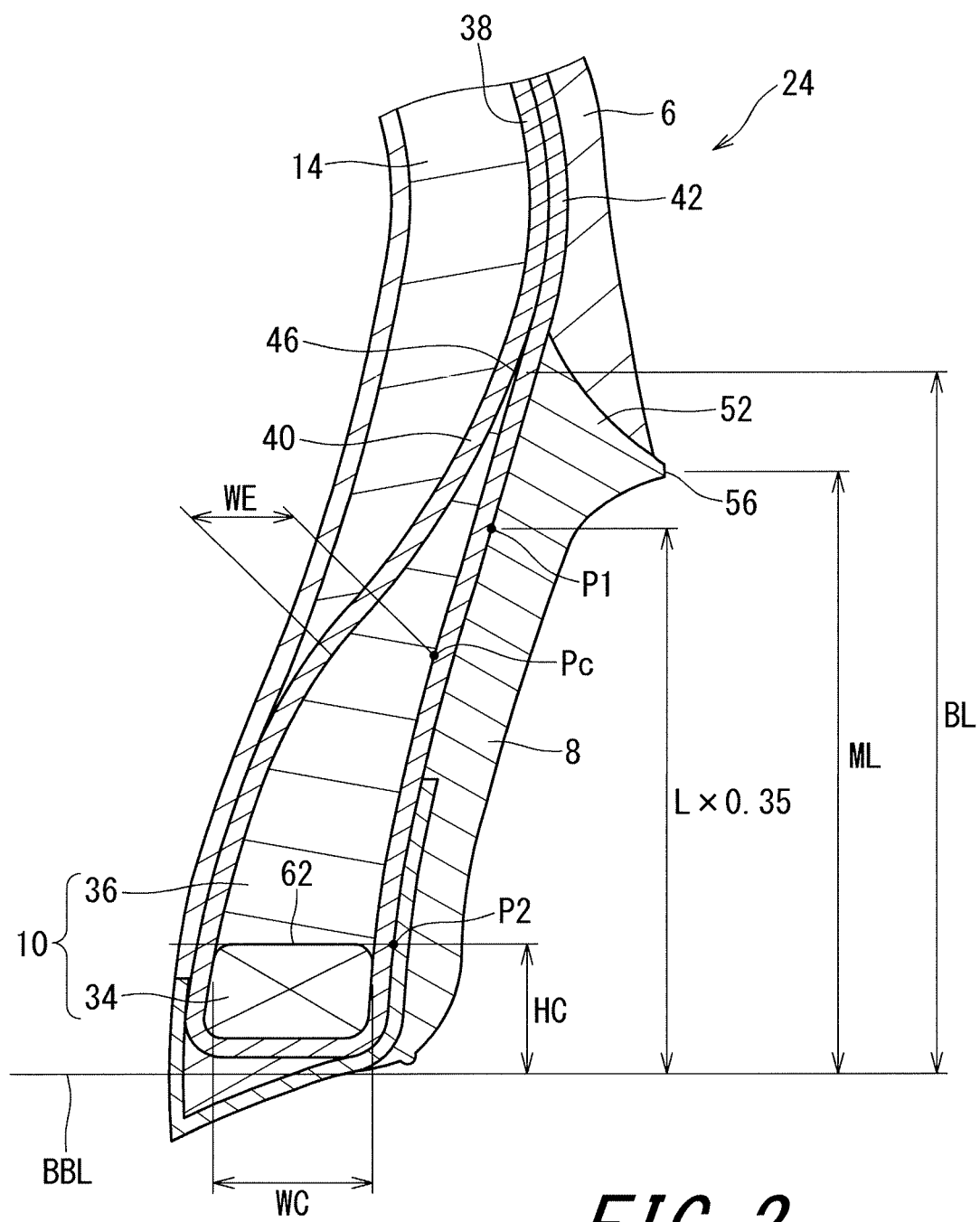
FIG. 2 is an enlarged cross-sectional view of a portion of the tire in FIG. 1.

FIG. 2 is an enlarged cross-sectional view of a portion of the side portion 24 of the tire 2 in FIG. 1. In FIG. 2, the up-down direction is the radial direction, the right-left direction is the axial direction, and the direction perpendicular to the surface of the sheet is the circumferential direction. As shown in FIG. 2, a rim protector 52 is formed in the side portion 24 so as to project outward in the axial direction in a tapered shape. The rim protector 52 is provided in the vicinity of the boundary between the sidewall 6 and the clinch 8. When the tire 2 is mounted onto the rim, the end surface of the rim protector 52 is located outward of the edge of the flange of the rim in the axial direction, which is not shown. The rim protector 52 projects from the edge of the flange in the axial direction. When the vehicle is moved close to a road shoulder, the rim protector 52 comes into contact with a curb. Thus, contact between the rim flange and the curb is avoided. The rim protector 52 prevents damage of the flange.

In FIG. 1, a solid line BBL represents a bead base line. The bead base line BBL corresponds to a line that defines the rim diameter of the rim (see JATMA) onto which the tire 2 is mounted. The bead base line BBL extends in the axial direction. A double-headed arrow L represents a cross-sectional height of the tire 2. Specifically, the height L is the height in the radial direction from the bead base line BBL to an equator 54 on the tread 4. In FIG. 2, a double-headed arrow HC indicates the height in the radial direction from the bead base line BBL to the outer edge of the core 34. A point P1 is a point on the turned-up portion 42 at which point the height in the radial direction from the bead base line BBL is 0.35 times of the height L. A point P2 is a point on the turned-up portion 42 at which point the height in the radial direction from the bead base line BBL is equal to the height HC.

As shown in FIG. 2, between the point P1 and the point P2, the shape of the turned-up portion 42 is a curved line projecting inward in the axial direction. The shape of the turned-up portion 42 does not have an inflection point. Between the point P1 and the point P2, the shape of the turned-up portion 42 may be a straight line. The shape of the turned-up portion 42 may be a combination of a straight line and a curved line projecting inward in the axial direction. In this case, each of the numbers of curved lines and straight lines that form the shape of the turned-up portion 42 is not limited to one. That is, the shape of the turned-up portion 42 may be a combination of one or a plurality of straight lines and one or a plurality of curved lines projecting inward in the axial direction. In this case as well, the shape of the turned-up portion 42 does not have an inflection point.

As shown in FIG. 2, in this embodiment, the point P1 is located outward of the point P2 in the axial direction. When the shape of the turned-up portion 42 between the point P1 and the point P2 is a straight line, the straight line is tilted outward in the axial direction toward the outer side in the radial direction.

The shape of the turned-up portion 42 is measured in a state where: the tire 2 is mounted onto a normal rim; the internal pressure of the tire 2 is set to normal pressure; and no load is applied to the tire 2.

In FIG. 2, a double-headed arrow ML indicates the height in the radial direction from the bead base line BBL to an end 56 of the rim protector 52. In the tire 2, the ratio (ML/L) of the height ML relative to the height L is equal to or greater than 0.40 and equal to or less than 0.60.

The following will describe advantageous effects of the present invention.

Figure 3:
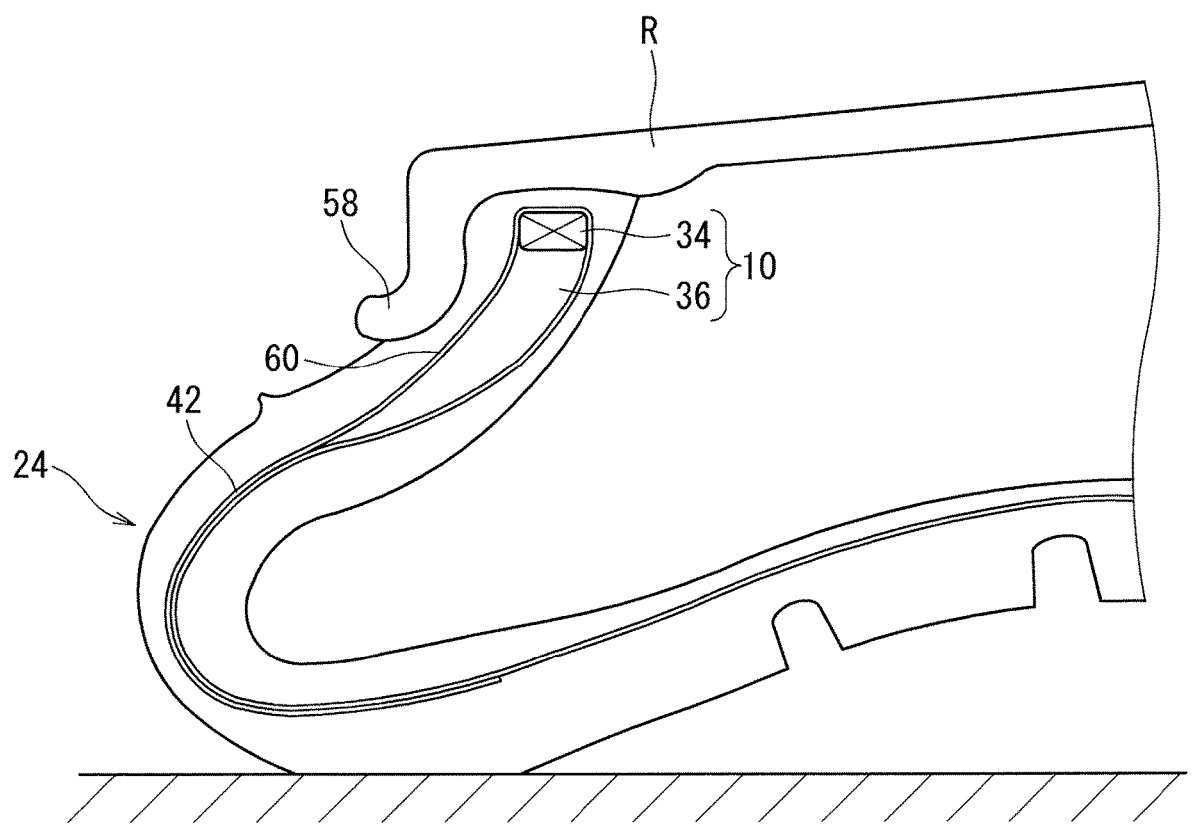
FIG. 3 is a schematic diagram of the tire in a run-flat running state.

FIG. 3 is a schematic diagram showing a state of the tire 2 during run-flat running. The tire is mounted on a rim R. As shown in FIG. 3, during run-flat running, each side portion 24 of the tire 2 greatly bends. The vicinity of the bead 10 is pressed against a rim flange 58. Thus, the apex 36 deforms into a round shape projecting inward in the axial direction. In the vicinity of the apex 36, the turned-up portion 42 of the carcass ply 38 also deforms into a round shape projecting inward in the axial direction. In the present specification, this portion is referred to as an "inward deformation portion 60" of the turned-up portion 42. In an existing tire, the inward deformation portion of the turned-up portion has a round shape projecting outward in the axial direction, in a state where no load is applied. That is, the inward deformation portion is curved in a direction opposite to the direction in which the inward deformation portion deforms during run-flat running. Thus, when each side portion bends, great compressive strain occurs in the inward deformation portion. This can cause separation of the cords of the turned-up portion from the rubber surrounding the cords. This can cause damage during run-flat running.

In the pneumatic tire 2 according to the present invention, between the point P1 and the point P2 described above, the turned-up portion 42 has a shape that is a curved line projecting inward in the axial direction, a straight line, or a combination thereof. The region of the turned-up portion 42 between the point P1 and the point P2 corresponds to the inward deformation portion 60. The inward deformation portion 60 is not curved in a direction opposite to a direction in which the inward deformation portion 60 deforms during run-flat running. Even during run-flat running, strain of the inward deformation portion 60 is small. In the turned-up portion 42, separation of the cords from the rubber is suppressed. The tire 2 has favorable run-flat durability.

In a vulcanization step for a tire, a raw cover is pressurized and heated between the cavity surface of a mold and a bladder. By the pressurization and heating, a rubber composition of the raw cover flows. By the heating, cross-linking reaction is caused in the rubber, so that the tire is formed. Each rim protector projects outward in the axial direction. The amount of the rubber composition in the rim protector portion is larger than that in a portion surrounding the rim protector portion. When the rubber composition flows in the vulcanization step, deformation of the turned-up portion into a round shape projecting outward in the axial direction can occur due to flow of the rubber at the rim protector. In the vicinity of the rim protector, the turned-up portion is curved outward in the axial direction. In an existing tire, each rim protector is located in the vicinity of the bead. In the existing tire, each rim protector is located in the vicinity of the inward deformation portion of the turned-up portion. Due to the flow of the rubber in the vicinity of the rim protector, the inward deformation portion is curved in a direction opposite to a direction in which the inward deformation portion deforms during run-flat running. Accordingly, during run-flat running, compressive strain of the inward deformation portion is increased.

In the tire 2, the ratio (ML/L) of the height ML of the top of the rim protector 52 relative to the cross-sectional height L of the tire 2 is equal to or greater than 0.40. In the tire 2, the rim protector 52 is located more outward in the radial direction than in a conventional tire. The rim protector 52 is located outward of the inward deformation portion 60 of the turned-up portion 42. Flow of the rubber in the vicinity of the rim protector 52 almost does not influence the shape of the inward deformation portion 60 of the turned-up portion 42. Curving of the inward deformation portion 60 outward in the axial direction is suppressed. In the tire 2, strain of the inward deformation portion 60 is small even during run-flat running. In the turned-up portion 42, separation of the cords from the rubber is suppressed. The tire 2 has favorable run-flat durability. From this standpoint, the ratio (ML/L) is more preferably equal to or greater than 0.45.

In the tire 2, the ratio (ML/L) of the height ML of the top of the rim protector 52 relative to the cross-sectional height L is equal to or less than 0.60. As a result of making the ratio (ML/L) equal to or less than 0.60, the rim protector 52 comes into contact with a curb when the vehicle is moved close to a road shoulder. Thus, contact between the rim flange 58 and the curb is avoided. The rim protector 52 can prevent damage of the flange 58. From this standpoint, the ratio (ML/L) is more preferably equal to or less than 0.55.

In order for the rim protector 52 to protect the rim, the end surface of the rim protector 52 needs to be located outward of the edge of the flange 58 of the rim in the axial direction. In the tire 2, the ratio (ML/L) is equal to or greater than 0.40 and equal to or less than 0.60. The rim protector 52 is located in the vicinity of the center of the side portion 24. In the vicinity of the center of the side portion 24, the width of the tire 2 is larger than that in the vicinity of the bead 10. Even when the rim protector 52 is a rim protector that is smaller in size than a conventional one, the end surface of the rim protector 52 can be located outward of the edge of the flange 58 of the rim. In the tire 2, the size of the rim protector 52 can be made smaller than in the conventional tire. This decreases the weight of the tire 2. In the tire 2 of this embodiment, the rolling resistance can be reduced.

As described above, in the tire 2, the run-flat durability is improved by appropriately shaping the turned-up portion 42 of the carcass ply 38 and adjusting the position of the rim protector 52. The number of carcass plies 38 is not increased, and a reinforcing layer is not inserted. In the tire 2, an increase in the vertical stiffness constant thereof and an increase in the weight thereof are suppressed. In the tire 2, favorable ride comfort and low rolling resistance are maintained. Although not shown in this embodiment, since the run-flat durability is improved in the bead portion, favorable run-flat durability can be maintained even when the thickness of each load support layer is decreased. Accordingly, the vertical stiffness constant and the weight can be reduced. Therefore, improvement of the ride comfort and reduction of the rolling resistance can be achieved.

In FIG. 2, a double-headed arrow BL indicates the height in the radial direction from the bead base line BBL to the end 46 of the apex 36. The ratio (BL/L) of the height BL relative to the height L is preferably equal to or greater than 0.45. By making the ratio (BL/L) equal to or greater than 0.45, stress is prevented from being concentrated on the bead 10 during run-flat running. Damage of the bead 10 during run-flat running is suppressed. The tire 2 has favorable run-flat durability. From this standpoint, the ratio (BL/L) is more preferably equal to or greater than 0.50. The ratio (BL/L) is preferably equal to or less than 0.65. By making the ratio (BL/L) equal to or less than 0.65, the vertical stiffness constant can be appropriately reduced. With the tire 2, favorable ride comfort is maintained. From this standpoint, the ratio (BL/L) is more preferably equal to or less than 0.60.

In FIG. 2, a point Pc is the midpoint between an inner edge 62 of the apex 36 and the end 46 of the apex 36 in the radial direction. That is, in the radial direction, the distance from the point Pc to the inner edge 62 of the apex 36 is equal to the distance from the point Pc to the end 46 of the apex 36. A double-headed arrow WE indicates the width, in the axial direction, of the apex 36 at the point Pc. A double-headed arrow WC indicates the width, in the axial direction, of the radially outer surface of the core 34. The radially outer surface of the core 34 is in contact with the apex 36. The double-headed arrow WC indicates the width, in the axial direction, of the surface of the core 34 which surface is in contact with the apex 36.

The ratio (WE/WC) of the width WE relative to the width WC is preferably equal to or greater than 0.50. By making the ratio (WE/WC) equal to or greater than 0.50, the bead 10 portion has sufficient stiffness. This reduces deformation of the bead 10 portion during run-flat running. Damage of the bead 10 portion during run-flat running is suppressed. The tire 2 has favorable run-flat durability. From this standpoint, the ratio (WE/WC) is more preferably equal to or greater than 0.55. The ratio (WE/WC) is preferably equal to or less than 0.80. By making the ratio (WE/WC) equal to or less than 0.80, the vertical stiffness constant can be appropriately reduced. With the tire 2, favorable ride comfort is maintained. From this standpoint, the ratio (WE/WC) is more preferably equal to or less than 0.75.

In FIG. 1, a double-headed arrow WT represents the clip width of the tire 2. Specifically, the clip width WT is the distance in the axial direction between a heel 64 of the one side portion 24 and a heel 64 of the other side portion 24. The clip width WT is measured on the assumption of the cavity surface of a mold. The ratio (WT/WR) of the clip width WT relative to a rim width WR of a standard rim onto which the tire 2 is mounted is preferably equal to or less than 1.03. By making the ratio (WT/WR) equal to or less than 1.03, deformation of the side portion 24 is suppressed when the tire 2 is mounted onto the rim. Curving of the inward deformation portion 60 of the turned-up portion 42 outward in the axial direction is suppressed. Even during run-flat running, strain at the inward deformation portion 60 is small. In the turned-up portion 42, separation of the cords from the rubber is suppressed. The ratio (WT/WR) is preferably equal to or greater than 0.97. By making the ratio (WT/WR) equal to or greater than 0.97, it is made possible to firmly mount the tire 2 onto the rim. The tire 2 is prevented from becoming detached from the rim.

In the tire 2, the dimensions and angles of each component of the tire 2 are measured in a state where the tire 2 is mounted on a normal rim and inflated to a normal internal pressure, unless otherwise specified. During the measurement, no load is applied to the tire 2. In the present specification, the normal rim means a rim specified in a standard on which the tire 2 is based. The "standard rim" in the JATMA standard, the "Design Rim" in the TRA standard, and the "Measuring Rim" in the ETRTO standard are normal rims. In the present specification, the normal internal pressure means an internal pressure specified in the standard on which the tire 2 is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures. In the case where the tire 2 is designed for a passenger car, the dimensions and angles are measured in a state where the internal pressure is 180 kPa.

EXAMPLES

Example 1

A pneumatic tire (run flat tire) of Example 1 having the configuration shown in FIG. 1 and having specifications shown in Table 1 below was obtained. The size of the tire is 225/60RF18. In the tire, the height L is 135 mm. The height HC is 10 mm. In the tire, between the point P1 and the point P2, the shape of the turned-up portion is a circular arc projecting inward in the axial direction. This is represented as "inward circular arc" in the cell for turned-up portion shape in Table 1. In the tire, the ratio (WE/WC) is 0.65. The ratio (WT/WR) is 1.0. In the tire, the maximum width of the load support layer is reduced by 20% as compared to a conventional tire shown in Comparative Example 1 described below. This is because improvement of the run-flat durability by the present invention makes it possible to reduce the width of the load support layer. The maximum width of the load support layer is shown in the cell for load support layer width in Table 1 as an index with the width of the load support layer of Comparative Example 1 described below being defined as 100.

Comparative Example 1

A tire of Comparative Example 1 was obtained in the same manner as in Example 1, except the shape of the turned-up portion between the point P1 and the point P2 is a circular arc projecting outward in the axial direction, and the width of the load support layer is different as shown in Table 1. The tire of Comparative Example 1 is a conventional run flat tire. The shape of the turned-up portion between the point P1 and the point P2 being a circular arc projecting outward in the axial direction is represented as "outward circular arc" in the cell for turned-up portion shape in Table 1.

Example 2

A tire of Example 2 was obtained in the same manner as in Example 1, except the shape of the turned-up portion between the point P1 and the point P2 is a straight line. The shape of the turned-up portion between the point P1 and the point P2 being a straight line is represented as "straight line" in the cell for turned-up portion shape in Table 1.

Examples 3 and 4 and Comparative Examples 2 to 5

Tires of Examples 3 and 4 and Comparative Examples 2 to 5 were obtained in the same manner as in Example 1, except the height ML was changed such that the value of the ratio (ML/L) was as shown in Table 2.

Examples 5 to 11

Tires of Examples 5 to 11 were obtained in the same manner as in Example 1, except the height BL was changed such that the value of the ratio (BL/L) was as shown in Table 3.

[Run-Flat Durability]

Each tire was mounted onto a normal rim (size=6.5 J), and a punctured state was reproduced by setting the internal pressure of the tire to normal pressure. The tire was attached to a drum-type running tester, and a vertical load (7.5 kN) corresponding to 65% of the maximum applied load in JATAM was applied to the tire. The tire was caused to run at a speed of 80 km/h on a drum having a radius of 1.7 m, and the running distance until the tire became damaged was measured. The results are shown in Tables 1 to 3 below as index values with the value of Comparative Example 1 being defined as 100. The higher the value is, the better the result is. The higher the value is, the more excellent the tire is in run-flat durability.

[Tire Weight]

The weight of each tire was measured. The results are shown in Tables 1 to 3 below as index values with the value of Comparative Example 1 being defined as 100. A lower value indicates a lower weight. The lower the value is, the better the result is.

[Rolling Resistance]

The rolling resistance was measured with a rolling resistance tester under the following measurement conditions.

Used rim: 6.5 J
Internal pressure: 220 kPa
Load: 7.5 kN
Speed: 80 km/h
The results are shown in Tables 1 to 3 below as index values with the value of Comparative Example 1 being defined as 100. The lower the value is, the better the result is.

[Vertical Stiffness Constant]

The vertical stiffness constant of the tire was measured under the following conditions.
Used rim: 6.5 J
Internal pressure: 220 kPa
Load: 5.0 kN
The results are shown in Tables 1 to 3 below as index values with the value of Comparative Example 1 being defined as 100. A lower value represents a lower vertical stiffness constant. The lower the value is, the better the result is.

[Rim Protection Performance]

Each tire was mounted onto a normal rim (size=6.5 J) and inflated with air to an internal pressure of 220 kPa. The tire was attached to a front-wheel-drive passenger car having an engine displacement of 2400 cc. The vehicle was caused to run at a speed of 30 km/h, and the left front wheel was caused to move over a 10 cm-height curb on a road surface. The angle of the running direction relative to the curb was set to 15°. Presence/absence of damage of the rim flange 58 was checked. The tire was evaluated as Pass if damage was not present, and was evaluated as Fail if damage was present. The results are shown in Tables 1 and 2 below. The tires of Examples 5 to 11 were not evaluated for rim protection performance, since the height ML thereof was not changed from Example 1.

TABLE 1

Results of Evaluation

|  | Comparative Example 1 | Example 1 | Example 2 |
|---|---|---|---|
| Turned-up portion shape | Outward circular arc | Inward circular arc | Straight line |
| Ratio (ML/L) | 0.50 | 0.50 | 0.50 |
| Ratio (BL/L) | 0.55 | 0.55 | 0.55 |
| Load support layer width | 100 | 80 | 80 |
| Vertical stiffness constant | 100 | 85 | 85 |
| Weight | 100 | 90 | 90 |
| Rolling resistance | 100 | 90 | 90 |
| Run-flat durability | 100 | 115 | 114 |
| Rim protection performance | Pass | Pass | Pass |

TABLE 2

Results of Evaluation

|  | Comparative Example 2 | Comparative Example 3 | Example 3 | Example 4 | Comparative Example 4 | Comparative Example 5 |
|---|---|---|---|---|---|---|
| Turned-up portion shape | Inward circular arc | Inward circular arc | Inward circular arc | Inward circular arc | Inward circular arc | Inward circular arc |
| Ratio (ML/L) | 0.30 | 0.38 | 0.40 | 0.60 | 0.62 | 0.70 |
| Ratio (BL/L) | 0.55 | 0.55 | 0.55 | 0.55 | 0.55 | 0.55 |
| Load support layer width | 80 | 80 | 80 | 80 | 80 | 80 |
| Vertical stiffness constant | 85 | 85 | 85 | 85 | 85 | 85 |
| Weight | 90 | 90 | 90 | 90 | 90 | 90 |
| Rolling resistance | 90 | 90 | 90 | 90 | 90 | 90 |
| Run-flat durability | 101 | 104 | 110 | 116 | 117 | 117 |
| Rim protection performance | Pass | Pass | Pass | Pass | Fail | Fail |

TABLE 3

Results of Evaluation

|  | Example 5 | Example 6 | Example 7 | Example 8 | Example 9 | Example 10 | Example 11 |
|---|---|---|---|---|---|---|---|
| Turned-up portion shape | Inward circular arc | Inward circular arc | Inward circular arc | Inward circular arc | Inward circular arc | Inward circular arc | Inward circular arc |
| Ratio (ML/L) | 0.50 | 0.50 | 0.50 | 0.50 | 0.50 | 0.50 | 0.50 |
| Ratio (BL/L) | 0.30 | 0.48 | 0.50 | 0.60 | 0.65 | 0.68 | 0.80 |
| Load support layer width | 80 | 80 | 80 | 80 | 80 | 80 | 80 |

TABLE 3-continued

| | Results of Evaluation | | | | | | |
|---|---|---|---|---|---|---|---|
| | Example 5 | Example 6 | Example 7 | Example 8 | Example 9 | Example 10 | Example 11 |
| Vertical stiffness constant | 85 | 85 | 85 | 85 | 88 | 90 | 95 |
| Weight | 88 | 89 | 90 | 90 | 92 | 93 | 95 |
| Rolling resistance | 90 | 90 | 90 | 90 | 91 | 92 | 92 |
| Run-flat durability | 105 | 107 | 111 | 113 | 113 | 112 | 111 |
| Rim protection performance | — | — | — | — | — | — | — |

As shown in Tables 1 to 3, the evaluation is higher in the tires of the examples than in the tires of the comparative examples. From the results of evaluation, advantages of the present invention are clear.

The tire described above is applicable to various vehicles.

The above descriptions are merely illustrative examples, and various modifications can be made without departing from the principles of the present invention.

What is claimed is:

1. A pneumatic tire comprising:
a pair of beads each located in a side portion;
a carcass extending on and between the one bead and the other bead; and
a pair of load support layers each located in the respective side portion and inward of the carcass in an axial direction, wherein
a rim protector is formed in the respective side portion so as to be project outward in the axial direction in a tapered shape,
each bead includes a core and an apex extending from the core outward in a radial direction,
the carcass includes a carcass ply,
the carcass ply is turned up around each core from an inner side toward an outer side in the axial direction,
because of this turning-up, a main portion and turned-up portions are formed in the carcass ply,
in each bead, when a cross-sectional height of the tire is denoted by L, a height in each bead in the radial direction from a bead base line BBL to an outer edge of the core is denoted by HC, a height in the radial direction of the turned-up portion of the carcass ply from the bead base line BBL is at least 0.35 times of the height L such that a point on the turned-up portion at which point a height in the radial direction from the bead base line BBL is 0.35 times of the height L is denoted by P1, and a point on the turned-up portion at which point the height in the radial direction from the bead base line BBL is equal to the height HC is denoted by P2, the turned-up portion, between the point P1 and the point P2, has a shape of a straight line, and
a ratio ML/L of a height ML in the radial direction from the bead base line BBL to the radially innermost point of the axially outer surface of the rim protector relative to the height L is equal to or greater than 0.40 and equal to or less than 0.60.

2. The pneumatic tire according to claim 1, wherein in each bead a ratio BL/L of a height BL in the radial direction from the bead base line BBL to an end of the apex relative to the height L is equal to or greater than 0.45 and equal to or less than 0.65.

3. The pneumatic tire according to claim 1, wherein in each bead
the apex has a shape tapered outward in the radial direction, and
when a width, in the axial direction, of the apex at a midpoint, in the radial direction, of the apex is denoted by WE and a width, in the axial direction, of the radially outer surface of the core in contact with the apex is denoted by WC, a ratio (WE/WC) of the width WE relative to the width WC is equal to or greater than 0.50 and equal to or less than 0.80.

4. The pneumatic tire according to claim 1, wherein a ratio (WT/WR) of a clip width WT of the tire relative to a standard rim width WR is equal to or greater than 0.97 and equal to or less than 1.03.

* * * * *